UNITED STATES PATENT OFFICE.

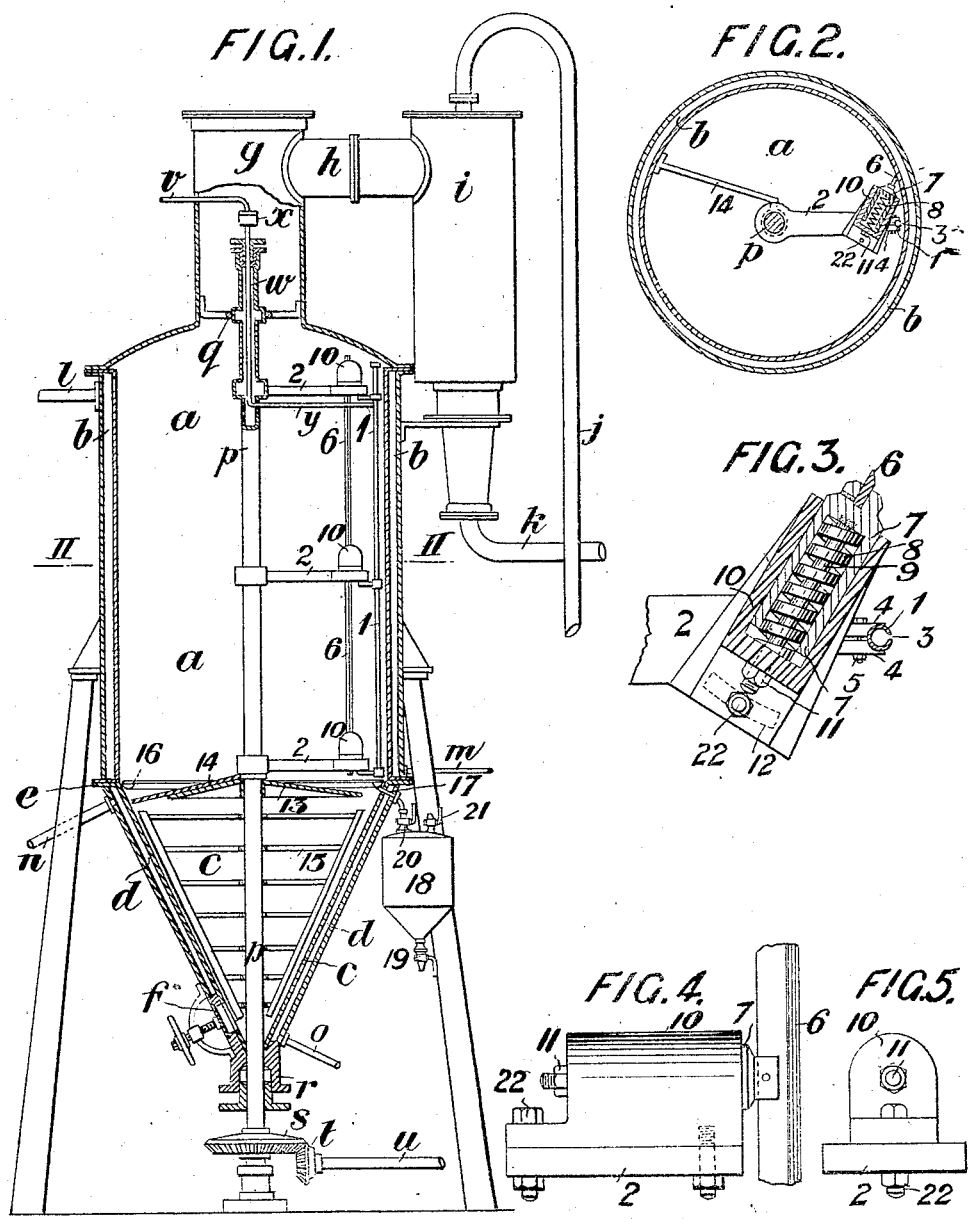

SÖREN PETER RASMUSSEN, OF HANWELL, ENGLAND.

DESICCATING APPARATUS.

No. 879,490.  Specification of Letters Patent.  Patented Feb. 18, 1908.

Application filed September 19, 1907. Serial No. 393,688.

*To all whom it may concern:*

Be it known that I, SÖREN PETER RASMUSSEN, a subject of the King of Denmark, residing at 29 Cherington road, Hanwell, in the county of Middlesex, England, have invented new and useful Improvements in Desiccating Apparatus, of which the following is a specification.

The apparatus consists of a cylindrical vessel upon the inner wall of which the milk, dissolved casein or other liquid or semi-liquid is delivered in a thin stream or jet by means of a slowly rotating jet device so that a thin layer or film of milk is continuously being deposited on the said inner wall. The jet device is in the immediate rear of a knife, scraper, or wiper, which continuously scrapes or wipes off the film of dried milk, that then drops down as a powder and can be removed from the lower part of the vessel. The vessel is heated externally by a steam jacket, means being provided for accurately regulating the steam supply and thus controlling the degree of heat required. The interior of the vessel is in communication with a vacuum pump or other vacuum producing device. The vessel terminates below in a cone which is surrounded by a jacket for a heating or cooling fluid medium as the case may require it.

The invention also comprises various details of construction which tend to render the apparatus practically suitable for the end in view.

A suitable form of apparatus is illustrated by the drawings, Figure 1 being a part sectional elevation, Fig. 2 a plan section on the line II—II Fig. 1, showing the scraper and milk jet pipe. Fig. 3 is a plan section Fig. 4 an elevation of the scraper and its holder, and Fig. 5 an end view of the latter all to a larger scale.

The vacuum pan is made in the form of a vertical cylinder $a$ provided with a steam jacket $b$ and terminating in a lower conical part $c$ provided with a jacket $d$ for an attemperating medium as for instance steam or water as the case may require. The two jackets are separated by a flange $e$.

$f$ is a hand hole for removing the milk powder or other powder.

The cylinder $a$ is or may be of steel or iron and is by preference bored out truly and polished it is at its upper end connected with a vacuum producing apparatus, and is in this example continued into a smaller cylinder $g$ which by a pipe $h$ is connected with a condenser $t$ of usual form for condensing the vapor from the milk or other liquid treated in the pan. The pipe $j$ connects the condenser $i$ with a pump or any other vacuum producing apparatus, and the pipe $k$ supplies water to the condenser.

$l$ is the steam inlet pipe and $m$ the outlet pipe from the jacket $b$. The pipes $n$ and $o$ serve similar purposes for the jacket $d$.

The vacuum pan is provided with the usual necessary fittings such as manhole, light hole, sight hole, vacuum gauze, thermometers, steam valves, safety valves, air cocks for the jackets, and electric light burners inside and outside.

In the center of the pan is provided a rotatable shaft $p$ working in a bearing $q$ at the top and a bearing at the bottom where it by preference passes out through a stuffing box $r$ and has there fixed on it a bevel wheel $s$ which gears with a bevel wheel $t$ on a horizontal driving shaft $u$. Or vice versa the shaft may be driven from the top where a stuffing box would then be provided. The upper part of the shaft is hollow and carries a small pipe $v$ which is connected with a small pipe $w$ which supplies the milk or other liquid or semiliquid to be treated. If as here shown the pipe $w$ enters laterally the pipe $v$ has a swivel connection $x$ with the pipe $w$. The hollow part of the shaft is by a small pipe $y$ connected to a vertical pipe 1 situated close to the inner wall of the pan.

The pipe 1 which is closed at both ends is supported from the shaft by arms 2, 2, 2, which are fixed on the shaft. The pipe is provided with a vertical narrow slit 3 as shown in Fig. 3, through which the milk issues in a thin sheet-like jet. The pipe is held between branches 4 of the arms 2. By means of the screws 5 the pipe 1 can be nipped or pinched more or less to regulate the width of the slit and jet. Upon the same arms 2 is yieldingly fixed a vertical knife, scraper, or wiper 6, see Figs. 3, 4 and 5. The scraper 6 is fixed in a piston 7 which is recessed to receive a helical spring 8, upon a rod 9 that at one end is screwed into the front end of the piston 7 and at the other end passes freely through the rear end of a cylinder 10. The nut 11 on this rod serves for adjusting the tension of the spring 8. The cylinder or holder 10 is by a bolt 22 fixed to the arm 2 and, while passing through a sector slot 12 in the latter, capable of being shifted angularly for adjusting the inclination of the knife 6 towards the inner wall of the vacuum pan, and so as to bear upon it with the proper but not too heavy pressure.

The powder or dried or partly dried film deposited during one rotation is removed from the inner wall of the part $a$ of the vacuum pan by the knife 6 and drops on to an umbrella shaped disk 13 fixed on the shaft and is raked off that disk by a stationary scraper 14 and thus carried down a slit in the disk 13 into the conical part $c$ of the pan. The shaft in its lower part may be provided with arms or a skeleton frame 15 for stirring the material and pushing it against the inner steam heated surface of this part in order to constantly expose fresh portions of the material to the heat so as to dry it completely. But in case the drying has already been carried far enough in the upper part $a$ of the pan the powder may be cooled in the lower part $c$, the jacket $d$ of which is then supplied with cold water.

In order to counteract the effect of a too liberal feed of milk to the slitter pipe 1 and to prevent this milk from falling into the dry powder in the lower part $c$ of the pan, an overflow gutter 16 may be fixed all round the bottom end of the part $a$ of the pan; this gutter has an outlet pipe 17 to a small closed receiver 18 placed outside of the pan and provided with a cock 19 for drawing off; a cock 20 is provided on the outlet pipe 17 from the overflow gutter 16, and when this cock is shut and the air cock 2' is opened, the receiver 18 can be emptied without vitiating the vacuum in the pan.

By the proper use of the aforesaid apparatus and while keeping the temperature in the pan at not more than 50 to 60 degrees C. a milk powder can be produced which is quite soluble in water and contains the enzymes and ferments present in milk; and generally speaking powders can be obtained from liquids or semi-liquids that shall contain the desired valuable constituent substances, the interior of the pan being kept at the required temperature as regulated by the temperature of the steam in the steam jacket $b$ of the pan $a$.

What I claim as my invention, and desire to secure by Letters Patent is:—

1. A cylindrical steam jacketed vacuum pan, a central slowly rotated shaft therein means attached to the shaft for continuously depositing a thin film of milk on the inner wall of the pan, means attached to the shaft for continuously scraping off the dried film a disk on the shaft for the dried material to fall upon a stationary scraper for raking it off and a handhole with cover for removing it.

2. A vacuum pan with upper truly bored cylindrical steam jacketed part and lower conical part provided with jacket for an attemperating fluid medium, a central slowly rotated shaft, a vertical pipe adapted to receive a continuous supply of milk and provided with adjustable outlet for the milk and for depositing it in a thin film on the inner cylindrical wall of the pan, and an adjustable yieldingly mounted knife or scraper for continuously scraping off the dried film the pipe being in the rear of the knife and both pipe and knife being carried by the shaft.

3. A cylindrical steam jacketed vacuum pan, a central slowly rotated shaft means attached to the shaft for continuously depositing a thin film of milk on the inner cylindrical wall of the pan, means attached to the shaft for continuously scraping off the dried film, an overflow gutter below the said means for milk supply, a disk on the shaft for the dried material to fall upon a stationary scraper for raking it off and a hand hole with cover for removing it.

4. A cylindrical steam jacketed vacuum pan a central slowly rotated shaft, hollow in its upper part for receiving the supply of milk, a vertical pipe connected with said hollow part and provided with adjustable slit outlet and a yieldingly mounted adjustable knife or scraper, both the pipe and the knife being carried by the shaft, and the pipe being in the rear of the knife.

5. A vacuum pan with upper cylindrical steam jacketed part and a lower conical part, provided with jacket for an attemperating fluid medium and terminating in a stuffing box, a central slowly rotated shaft passing out through the latter, its upper end being supported in a cylindrical upper prolongation of the aforesaid cylindrical part of the pan, said prolongation communicating with a condenser and thence with a vacuum pump, means attached to the shaft for continuously depositing a thin film of milk on the inner cylindrical wall of the pan, means attached to the shaft for continuously scraping off the dried film, a disk on the shaft for the dried material to fall upon, a stationary scraper for raking it off, and a hand hole with cover for removing it.

6. A cylindrical steam jacketed vacuum pan, a central slowly rotated shaft, means attached to an arm fixed on the shaft for continuously depositing a thin film of milk on the inner wall of the pan, a knife or scraper in the front of the said means a cylindrical part in which the knife is fixed and which has a recess with helical adjustable spring therein and a cylindrically bored holder for receiving the said cylindrical part, said holder being fixed on the said arm with means for angular adjustment thereon.

7. A cylindrical steam jacketed vacuum pan, a central slowly rotated shaft therein, means attached to the shaft for continuously depositing a thin film of milk on the inner wall of the pan, means attached to the shaft for continuously scraping off the dried film, an overflow gutter below the said means, and a closed receiver for the overflow, said receiver provided with inlet stop cock, outlet cock and air cock.

8. The combination with a vacuum pan having a vaporizing and a collecting chamber; of a liquid distributing pipe moving within the pan and with relation to the internal surface of the vaporizing chamber to deposit a thin film of liquid on the wall of the vaporizing chamber, and means to scrape the dried material into the collecting chamber.

9. The combination with a vertical vacuum pan having a vertical vaporizing chamber and a collecting chamber below the latter; of a liquid supply pipe movable in proximity to the interior surface of the vaporizing chamber and a scraper movable in advance of the distributing pipe to scrape the desiccated material from the walls of the desiccating chamber and permit it to fall into the collecting chamber.

In testimony whereof I have signed my name to this specification in the presence of two subscribing witnesses.

SÖREN PETER RASMUSSEN.

Witnesses:
    F. F. MEADOWS,
    F. L. RANDS.